L. NELSON.
COOKING UTENSIL.
APPLICATION FILED NOV. 15, 1909.
986,848.
Patented Mar. 14, 1911.
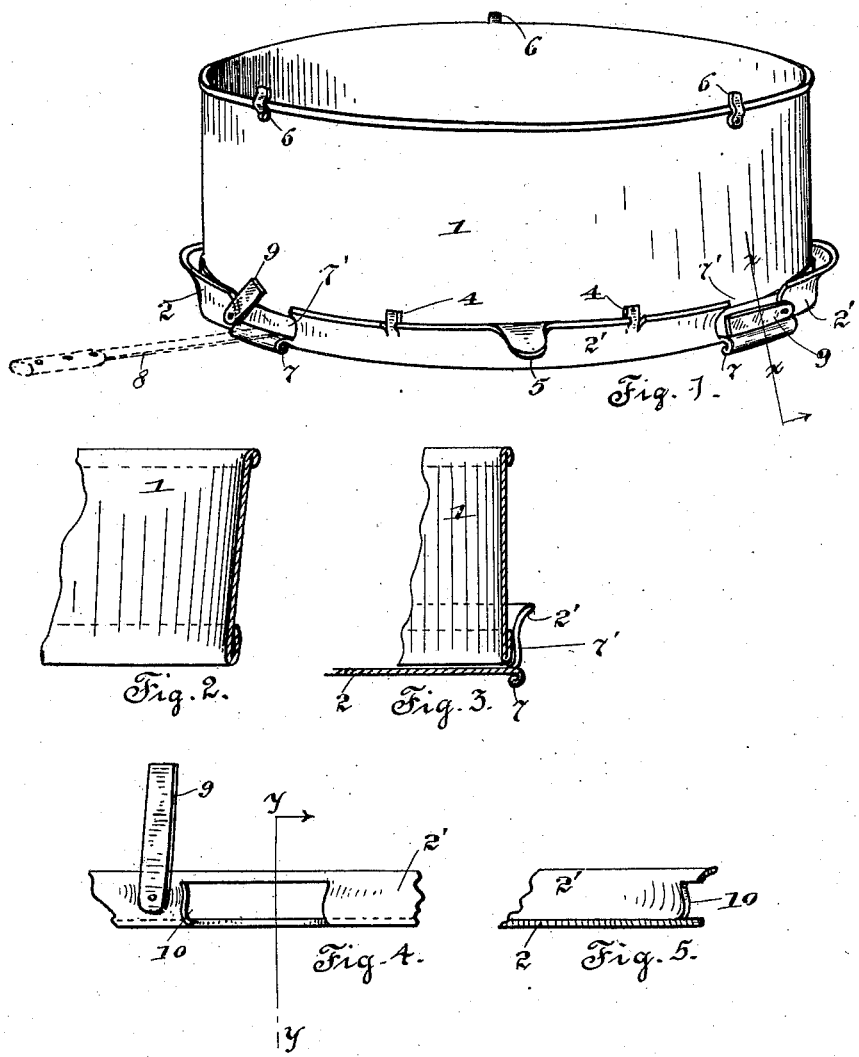
Witnesses
W. C. Smith
B. J. Richards
Inventor
Louise Nelson,
By Joshua R. H. Potts
her Attorney.

UNITED STATES PATENT OFFICE.

LOUISE NELSON, OF CHICAGO, ILLINOIS.

COOKING UTENSIL.

986,848. Specification of Letters Patent. Patented Mar. 14, 1911.

Application filed November 15, 1909. Serial No. 528,255.

*To all whom it may concern:*

Be it known that I, LOUISE NELSON, a citizen of the United States, residing at Chicago, county of Cook, and State of Illinois, have invented certain new and useful Improvements in Cooking Utensils, of which the following is a specification.

My invention relates to improvements in cooking utensils and more particularly to a baking pan for baking cake, the object being to provide means in a pan having a removable bottom to facilitate the removal of the cake, thus avoiding the usual expedient of using paper in the bottom of the pan, a further object being the production of a device of this character that shall be inexpensive of manufacture and convenient and reliable in use.

A further object of my invention is to provide suitable handles on the removable bottom and means incorporated therein for receiving the bottom portion of the pan and for securing the same thereto.

Other objects will appear hereinafter.

With these objects in view my invention consists in the novel construction and arrangement of parts which will be hereinafter fully described and more particularly pointed out in the appended claims.

My invention further consists in a pan having a modified form of bottom but possesses the same general characteristics as the preferred form.

My invention will be best understood by reference to the accompanying drawings forming a part of this specification, and in which, Figure 1 is a perspective view of my invention in its preferred form, Fig. 2 is a sectional view thereof showing a slight modification of the body portion of the pan, Fig. 3 is a vertical section taken on line $x$—$x$ of Fig. 1, Fig. 4 is a view showing a portion of a modified form of bottom of the pan, and Fig. 5 is a vertical section taken on line $y$—$y$ of Fig. 4.

Referring now to the drawings, 1 designates the body portion of the pan which is preferably cylindrical in form as shown in Fig. 1, but which may be slightly flaring as shown in Fig. 2, each of these forms being provided with reinforced top and bottom edges as shown.

The removable bottom 2 as shown in the drawings is circular in form to correspond with the body portion 1, but the pan is not necessarily circular since, a square, oblong, or any other suitable or desirable shape may be used for the baking of various kinds of cake. The bottom 2 is provided with a peripheral flange 2′ which extends upwardly and slightly inwardly, then is flared outwardly in order to readily receive the bottom portion 1. This flange is slightly flexible and presses inwardly against the reinforced lower edge of the body portion, thus holding the same securely in position. The edge of the flange 3 is formed into upwardly extending members 4 which press against the sides of the top portion 1, thus forming an auxiliary securing means. Handles 5, one only of which is shown, are arranged diametrically opposite and serve as a convenient means for lifting the pan. The upwardly extending legs 6 which are riveted to the top edge of the portion 1 serve to support the pan when inverted, this provision being to permit a draft of air to carry away steam and moisture from the cake when the same is cooling in the pan in the inverted position.

To prevent the pan bottom from coming into direct contact with the oven and thus avoid burning of the same during the baking process, short legs 7 are provided, the same being formed by cutting the flange 3 and bending the same downwardly as shown. The opening 7′ thus formed is designed to permit the insertion of the blade of a knife under the lower edge of the body portion 1, said knife being shown by dotted lines 8. When the knife is inserted between the cake and the bottom 2 and moved sidewise the cake ceases to stick, it being then an easy matter to pry the cake upwardly by means of the knife blade. Swinging lids 9 which are pivoted to the flange 3 are provided to prevent the possibility of dough from oozing between the lower edge of the portion 1 and the bottom 2.

In the modified form of pan bottom, as shown in Figs. 4 and 5, a slot 10 is provided instead of the opening 7′, the advantage being a continuous upper edge of the flange which presents a neat and finished appearance. In this form the legs 7 are omitted.

While I have shown what I deem to be the preferable form of my improved cooking utensil I do not wish to be limited thereto as there might be various changes made in the details of construction and the arrangement of parts described without departing from my invention, and hence I desire to avail myself of such changes and alterations as fairly fall within the spirit and scope of the appended claims.

Having described my invention what I claim as new and desire to secure by Letters Patent is:

1. A device of the class described comprising a body portion having substantially perpendicular sides, of a removable bottom therefor, and a flaring flange extending upwardly from said bottom and adapted to engage over the exterior of said body portion adjacent the lower edge thereof, said flange being provided with a plurality of openings substantially coextensive with the height thereof, substantially as described.

2. A device of the class described comprising a body portion having upwardly extending sides, a bottom therefor, a flange extending upwardly from the periphery of said bottom adapted to engage over the exterior of said body portion adjacent to the lower edge thereof, said flange having portions cut-away to form a plurality of openings substantially coextensive with the height thereof, and the said cut-away portions being bent to form supporting legs, substantially as described.

In testimony whereof I have signed my name to this specification in the presence of two subscribing witnesses.

LOUISE NELSON.

Witnesses:
JOSHUA R. H. POTTS,
JANET E. HOGAN.

Copies of this patent may be obtained for five cents each, by addressing the "Commissioner of Patents, Washington, D. C."